US 6,356,803 B1

(12) United States Patent
Goodman et al.

(10) Patent No.: US 6,356,803 B1
(45) Date of Patent: Mar. 12, 2002

(54) AUTOMATED DATA STORAGE LIBRARY DISTRIBUTED CONTROL SYSTEM

(75) Inventors: Brian Gerard Goodman; Leonard George Jesionowski; Michael Philip McIntosh; Fernando Quintana; Charles Anthony Thompson, Jr.; Raymond Yardy, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/573,531

(22) Filed: May 19, 2000

(51) Int. Cl.[7] .................................................. G06F 7/00
(52) U.S. Cl. ........................................ 700/218; 700/214
(58) Field of Search ................................ 700/214, 216, 700/217, 218

(56) References Cited

U.S. PATENT DOCUMENTS

| | | | |
|---|---|---|---|
| 5,214,768 A | | 5/1993 | Martin et al. ................ 395/425 |
| 5,260,690 A | * | 11/1993 | Mann et al. ............. 340/572 X |
| 5,504,873 A | | 4/1996 | Martin et al. ................ 395/438 |
| 5,513,156 A | | 4/1996 | Hanaoka et al. .............. 369/34 |
| 5,550,986 A | | 8/1996 | DuLac ....................... 395/280 |
| 5,920,702 A | | 7/1999 | Bleidt et al. ........... 395/200.61 |
| 5,949,686 A | | 9/1999 | Yoshinada et al. ...... 364/478.01 |
| 6,005,823 A | * | 12/1999 | Wang et al. ............. 370/332 X |

* cited by examiner

Primary Examiner—Christopher P. Ellis
Assistant Examiner—Gene O. Crawford
(74) Attorney, Agent, or Firm—John H. Holcombe; Robert M. Sullivan

(57) ABSTRACT

A distributed control system is provided for an automated data storage library. The library accesses data storage media in response to received commands, and comprises an accessor having a gripper for accessing the data storage media, and an XY system having servo motors for moving the accessor and the gripper. The distributed control system comprises a communication processor node for receiving commands, providing a communication link for the commands. An accessor processor node, which may be located at the accessor, is coupled to the communication processor node, the accessor processor node responsive to the linked commands, operating the gripper and providing move commands. An XY processor node may be provided at the XY system, coupled to the accessor processor node, the XY processor node responsive to the move commands, operating the servo motors. A common bus couples the communication processor node to the accessor processor node, and couples the accessor processor node to the XY processor node. A plurality of accessors may be provided, each with an accessor processor node coupled to the communication processor node.

30 Claims, 4 Drawing Sheets

FIG. 4

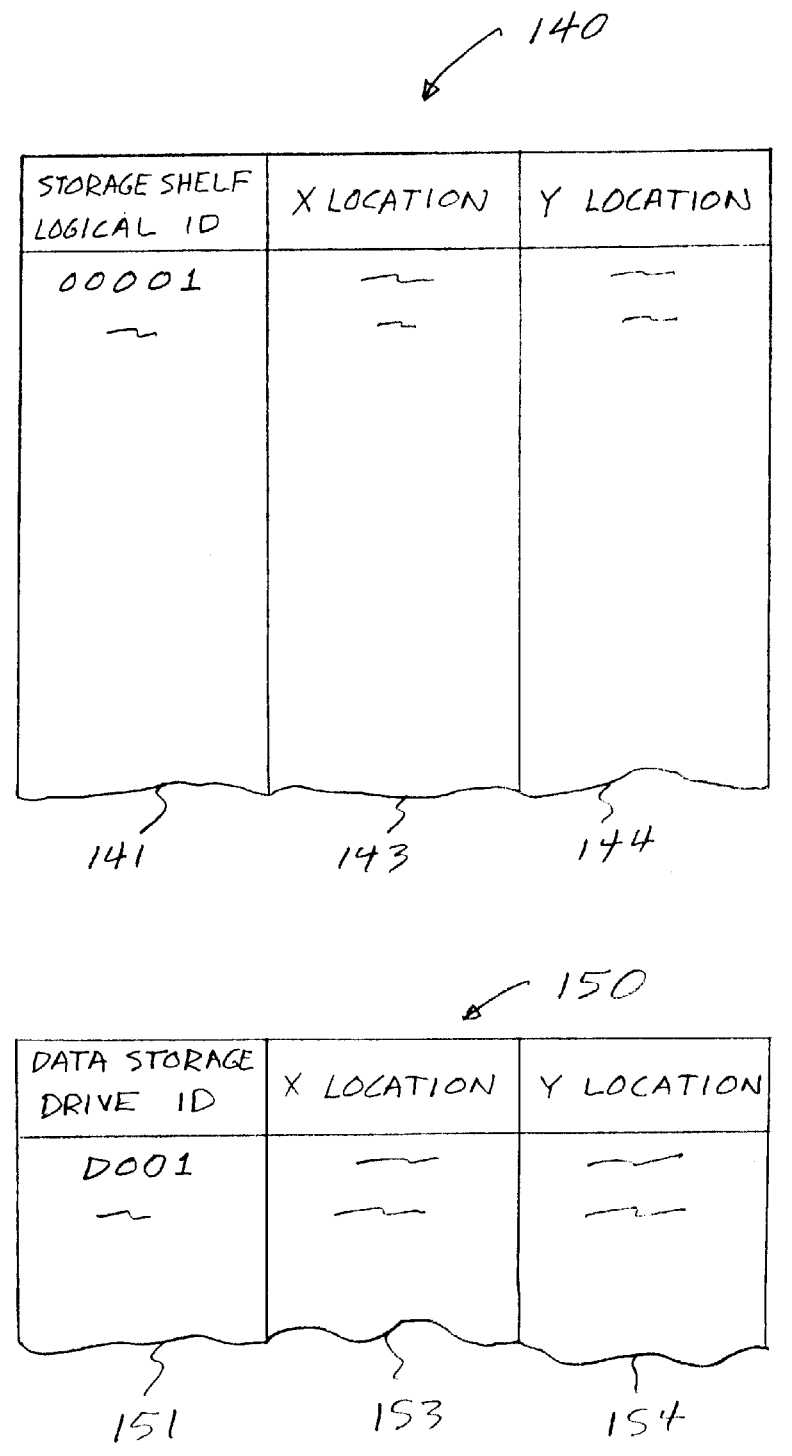

| STORAGE SHELF LOGICAL ID | X LOCATION | Y LOCATION |
|---|---|---|
| 00001 | — | — |
| — | — | — |

| DATA STORAGE DRIVE ID | X LOCATION | Y LOCATION |
|---|---|---|
| D001 | — | — |
| — | — | — |

151  153  154

150

AUTOMATED DATA STORAGE LIBRARY DISTRIBUTED CONTROL SYSTEM

FIELD OF THE INVENTION

This invention relates to automated data storage libraries, and, more particularly, to the control of the automated functions of the library for accessing data storage media in response to received commands.

BACKGROUND OF THE INVENTION

The typical automated data storage library comprises an accessor having a gripper for accessing data storage media, and an XY system having servo motors for moving the accessor in the X direction and the gripper in the Y direction. In some libraries, the X direction is a straight horizontal direction, with storage shelves for the data storage media and the data storage drives arranged in columns and rows on one or both sides of the accessor, and in others, the X direction is a circumferential horizontal direction, with the storage shelves arranged around the outer band of an inner cylinder and storage shelves and drives arranged around the inner band of an outer cylinder, and in both, the Y direction is vertical.

Also typically, the host system, such as a host server, communicates with a central controller for the library, either directly or through one or more data storage drives, providing commands to access particular data storage media and move the media between the storage shelves and the data storage drives, as well as I/O shelves and pass thru slots. The commands may be logical commands identifying the media and/or logical locations for accessing the media. The central controller includes a processor for receiving the logical commands and converting the commands to physical movements of the accessor and gripper. The central controller is typically mounted in the frame, but has been mounted on an accessor, and is connected by direct wiring, or wireless link such as infrared, to the XY system and to the gripper and directly operates the servo motors to conduct the desired physical movements. Of necessity, the wiring required between the central controller and all of the elements of the library becomes highly complex.

It is desirable to allow for expansion in the library to include additional storage shelves and data storage drives. In a straight horizontal library, this may be accomplished by adding expansion frames at one end of a base frame. However, adding expansion frames changes the physical size of the library and the many wiring cables must grow longer. As an example, an IBM 3494 automated data storage library is scaleable up to 16 frames. In order to simplify the part count and to simplify the process of expansion, it may be desirable to therefore provide all base frames for the library with the longest possible wiring cables. Thus, the library may be expanded to the maximum number of frames without requiring complete wiring changes. However, extra storage space must be provided in the base frame to house the extra length of these cables in libraries which are less than maximum length.

In a cylindrical library, or those that are not expandable, no additional frames are provided, and, instead, additional complete libraries must be provided, which are interconnected by pass through slots in which data storage media may be exchanged between the libraries. This results in requiring specialized control structures to track the data storage media in the multiple libraries.

It may also be advantageous to add a second accessor and gripper to an automated data storage library to add redundancy and to speed the access to data storage media. Typically, the second accessor is mounted to move in the X direction from a garage area at the end of the library opposite to the base frame. However, this adds complexity to the central controller and to the cabling, which now must reach from the base frame to the garage at the end of the library opposite the base frame and then back to the maximum distance that the accessor is allowed to travel. Alternatively, a second central controller may be provided at the far end, but many of the control signals and cabling must be shared.

Thus, the wiring necessary for scalability becomes complex and the wiring cable lengths from a central controller may reach undesirable distances and require inefficient space utilization to store the extra cabling for less than maximum length libraries.

As an example of the complexity of the library, the X and Y servo motors are typically DC brushless motors which require many power and signal wires that have to propagate all the way back to the base frame through multiple flex cables and intermediate connections. As the result, signals tend to degrade over the longer wires and multiple connections, there is susceptibility to noise and cross talk, a failure is difficult to isolate and repair, and electrical characteristics may change if the cable lengths are changed.

SUMMARY OF THE INVENTION

An object of the present invention is to provide a control system for an automated data storage library which allows the reduction of overly lengthy cabling and allows modular extension to the library and redundancy for the library.

A distributed control system is provided for an automated data storage library. The automated data storage library accesses data storage media in response to received commands, and comprises an accessor having a gripper for accessing the data storage media, and an XY system having servo motors for moving the accessor and moving the gripper. The distributed control system comprises a communication processor node for receiving commands, the communication processor node providing a communication link for the commands. An accessor processor node located at the accessor is coupled to the communication processor node, the accessor processor node responsive to the linked commands, operating the gripper and providing move commands. An XY processor node located at the XY system is coupled to the accessor processor node, the XY processor node responsive to the move commands, operating the XY servo motors.

In one embodiment, the accessor processor node is positioned at the gripper of the accessor.

In another embodiment, a common bus is provided, coupling the communication processor node to the accessor processor node, and coupling the accessor processor node to the XY processor node.

In still another embodiment, an extension frame is provided with an extension common bus coupled to the base frame common bus, and possibly another communication processor node located in the extension frame for receiving commands, the communication processor node coupled to the extension common bus, the communication processor node providing a communication link for the commands to the extension common bus, whereby the commands are linked to the base frame common bus and to the accessor processor node.

In a further embodiment, the automated data storage library may additionally have a high availability frame adjacent an extension frame, or adjacent the base frame. The high availability frame has another accessor having a gripper for accessing the data storage media, and an XY system for moving the accessor and gripper, e.g., in the X and Y directions. The distributed control system additionally comprises an extension common bus coupled either directly to the common bus of the base frame or to the base frame via an extension common bus of an extension frame. Another communication processor node is provided for receiving commands, the communication processor node coupled to the high availability frame extension common bus, the communication processor node providing a communication link for the commands to the extension common bus. An accessor processor node is located at the other accessor, coupled to the high availability frame extension common bus, and is responsive to the linked commands of the communication processor nodes, operating the gripper and operating the servo motors.

For a fuller understanding of the present invention, reference should be made to the following detailed description taken in conjunction with the accompanying drawings.

BRIEF DESCRIPTION OF THE DRAWINGS

FIG. 4 is a diagrammatic representation of a map of data storage shelves of the automated data storage library of FIGS. 1 and 3; and FIG. 5 is a diagrammatic representation of a map of data storage drives of the automated data storage library of FIGS. 1 and 3.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
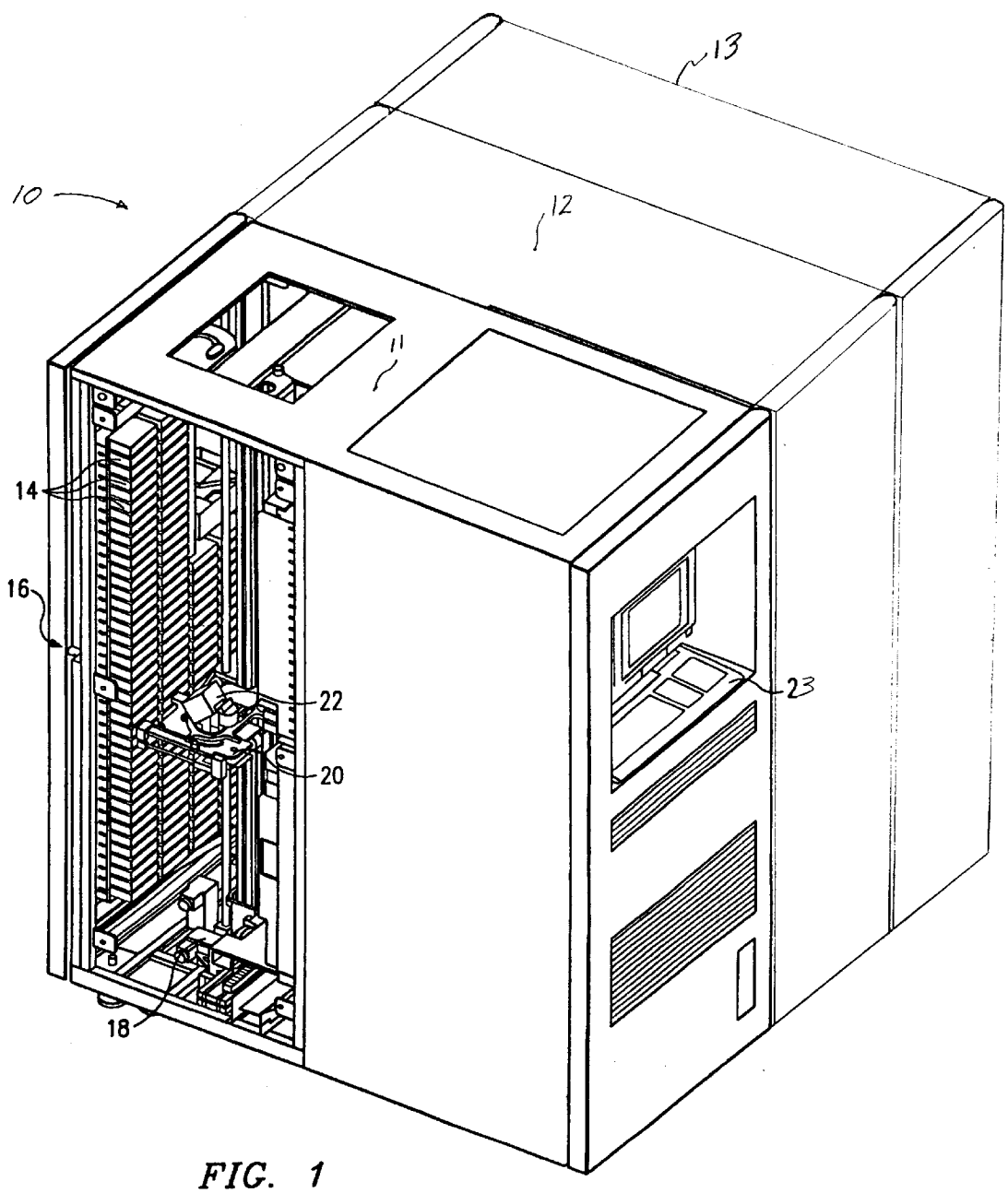
FIG. 1 is an isometric view of an automated data storage library implementing an embodiment of the present invention.
Figure 3:
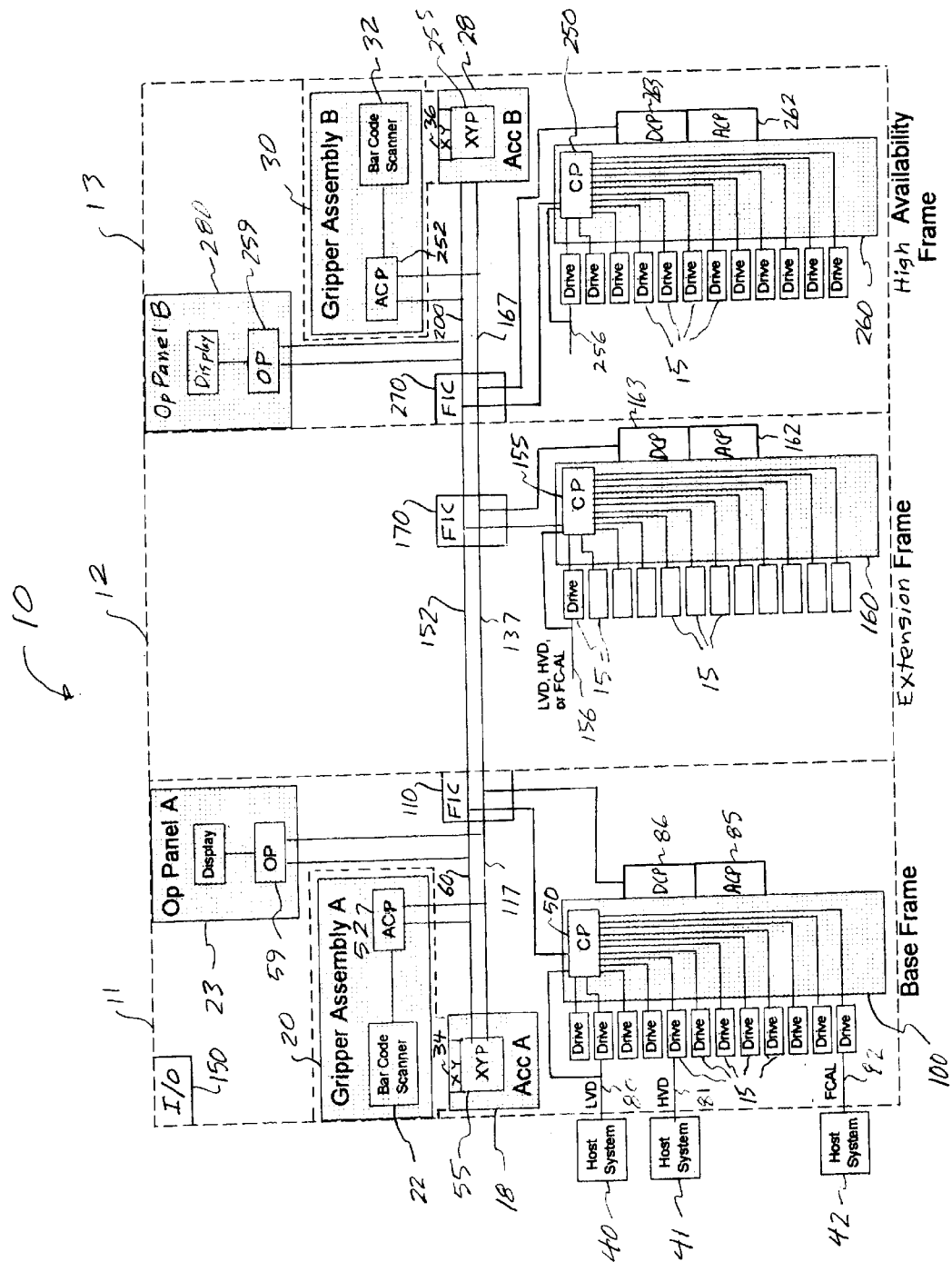
FIG. 3 is a block diagram of an embodiment of the distributed control system of the automated data storage library of FIG. 1 in accordance with the present invention employing processor nodes of FIG. 2.

FIGS. 1 and 3 illustrate an automated data storage library 10 which stores and retrieves data storage media 14 stored in storage shelves 16. An example of an auotmated data storage library which may implement the present invention is nthe IBM 3494 Tape Library Dataserver. The library comprises a base frame 11, may additionally comprise one or more extension frames 12, and may comprise a high availability frame 13.

The base frame 11 of the library 10 comprises one or more data storage drives 15, and an accessor 18. The accessor 18 includes a gripper assembly 20, and may include a bar code scanner 22 or reading system, such as a smart card reader or similar system, mounted on the gripper 20, to "read" identifying labels on the data storage media 14. The data storage drives 15, for example, may be optical disk drives or magnetic tape drives, and the data storage media 14 may comprise optical or magnetic tape media, respectively, or any other removable media and associated drives. The library may also comprise an I/O station 150 and an operator's panel 23 or other user interface, such as a web-based interface, which allows a user to interact with the library.

The extension frame 12 comprises additional storage shelves, and may comprise additional data storage drives 15 and/or an operator's panel or I/O station. The high availability frame may also comprise additional storage shelves and data storage drives 15, and comprises a second accessor 28, which includes a gripper assembly 30 and may include a bar code scanner 32 or other reading device, and an operator's panel 280, or other user interface. In the event of a failure or other unavailability of the accessor 18, or its gripper, etc., the second accessor 28 may take over.

Still referring to FIG. 3, the accessors 18, 28 each comprises an XY system 34, 36 having servo motors for, e.g., moving the associated accessor in the X direction and the gripper in the Y direction. In some libraries, the X direction is a straight horizontal direction, with storage shelves for the data storage media and the data storage drives arranged in columns and rows on one or both sides of the accessor, and in others, the X direction is a circumferential horizontal direction, with the storage shelves and drives arranged around a cylinder, and in both, the Y direction is vertical. The grippers 20, 30 each are operated to put and release, or to retrieve and grip the data storage media 14 at the storage shelves 16 and to load and unload the data storage media at the data storage drives 15. As is understood by those of skill in the art, a garage area may be provided for storage of accessor 18, and either high availability frame 13 may have a garage area or be without storage shelves or data storage drives to provide storage of accessor 28.

Referring to FIG. 3, the library 10 receives commands from one or more host systems 40, 41 or 42. The host systems, such as host servers, communicate with the library, either directly, e.g., on path 80, or through one or more data storage drives 15, providing commands to access particular data storage media and move the media, for example, between the storage shelves and the data storage drives. The commands are typically logical commands identifying the media and/or logical locations for accessing the media.

In accordance with the present invention, the library is controlled, not by a central controller, but rather, by a distributed control system for receiving the logical commands and converting the commands to physical movements of the accessor 18, 28 and gripper 20, 30, and for operating the servo motors in accordance with the desired physical movements. The distributed control system may also provide the logistical support, such as responding to host requests for element status, inventory, library status, etc.

The specific commands, the conversion of those commands to physical movements, and the operation of the servo motors are known to those of skill in the art and will not be repeated here.

The distributed control system comprises a communication processor node 50, for example, in the base frame 11. The communication processor node provides a communication link for receiving the host commands, either directly or from the drives 15. The communication processor node 50 may additionally provide a communication link for operating the data storage drives 15. In accordance with the present invention, the communication processor node 50 may be located in the frame 11, close to the data storage drives 15. An accessor processor node 52 is coupled to the communication processor node 50. The accessor processor node is responsive to the linked commands, and may operate the gripper 20 and provide X and Y move commands. The accessor processor node 52 is preferably located at the accessor 18, and may be mounted at the gripper 20, for operating the gripper while local to the gripper. An XY processor node 55 may be located at the XY system 34, and the XY system and the XY processor node 55 are preferably at the accessor 18. The XY processor node 55 may be coupled to the accessor processor node 52, and may be responsive to the X and Y move commands of the accessor node, operating the servo motors of the XY system 34. Also, an operator panel processor node 59 may be provided at the operator panel 23 for providing an interface for communicating between the operator panel and the communication processor node 50, the accessor processor node 52, and the XY processor node 55.

In accordance with another aspect of the present invention, a common bus 60 is provided, coupling the communication processor node 50 to the accessor processor node 52, and coupling the accessor processor node to the XY processor node 55. The operator panel processor node 59 may also be coupled to the common bus 60. The common bus may comprise a wiring network, such as the commercially available "CAN" bus system, which is a multi-drop network, having a standard access protocol and wiring standards, for example, as defined by CiA, the CAN in Automation Association, Am Weich selgarten 26, D-91058 Erlangen, Germany. Other similar bus networks may be employed in accordance with the present invention. Alternatively, the common bus 60 may comprise a wireless network system, such as RF or infrared, as is known to those of skill in the art.

The present invention employs the common bus to provide a distributed control system, where the nodes are congruent with the function. Each of the processor nodes may either recognize a message identifier associated with each message on the common bus, in accordance with CAN protocol, or may be specifically addressed with each message, for example, as is known in SCSI bus systems.

Each of the processor nodes may comprise special logic circuits or microprocessor systems, each designed for the special purpose, as is known to those of skill in the art, or may comprise similar microprocessor systems, each having specialized firmware to operate the processor node.

Figure 2:
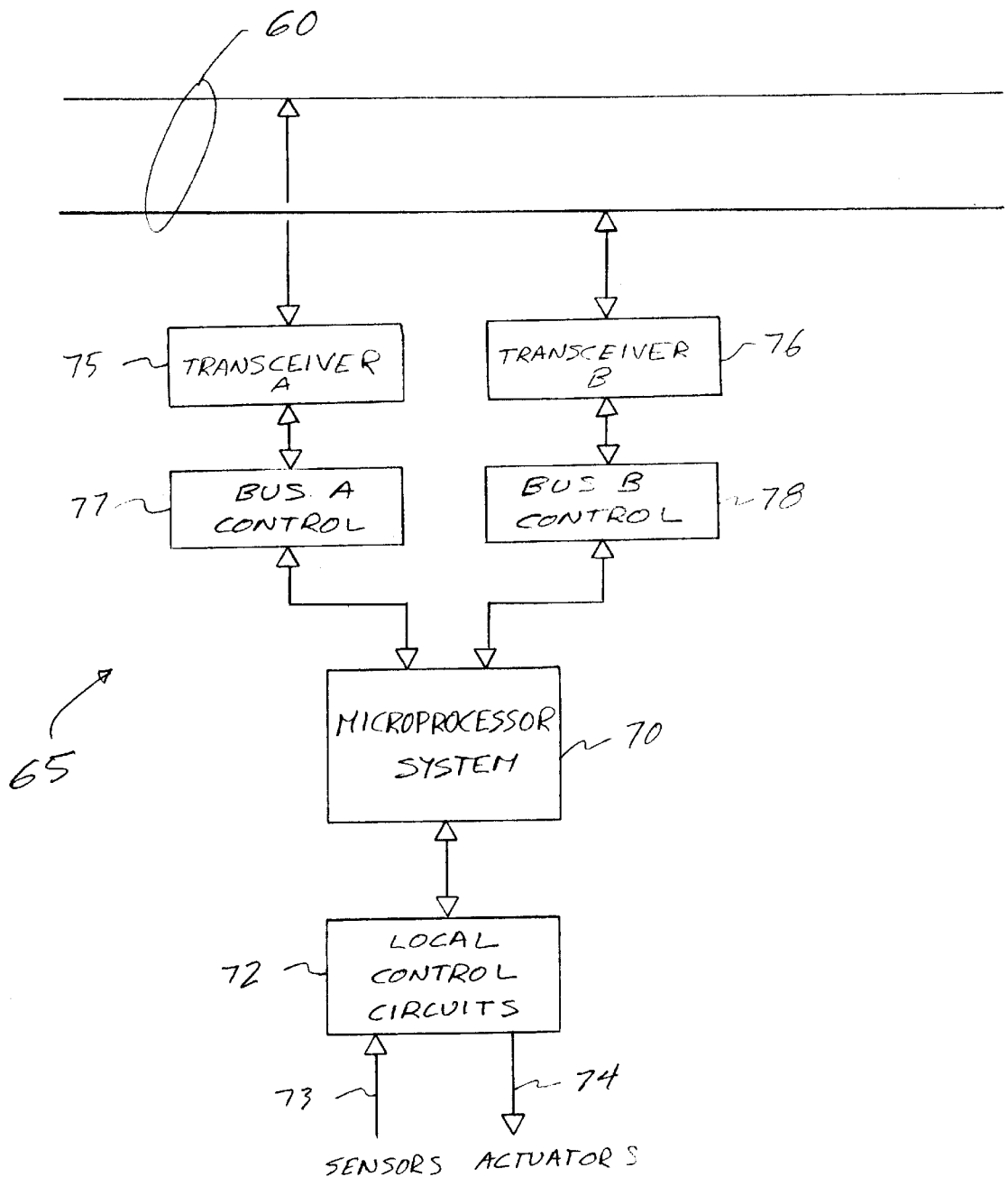
FIG. 2 is a block diagram of an embodiment of a processor node employed to control and operate components of the automated data storage library of FIG. 1.

FIG. 2 illustrates an embodiment of a processor node 65 employed to control and operate components of the automated data storage library 10. A microprocessor system 70 of the type that is commercially available, for example, from Intel or AMD, typically comprises a microprocessor, and a non-volatile memory for storing the firmware which operates the microprocessor. The microprocessor is coupled to local control circuits 72 which respectively receive signals 73 from sensors, and send signals 74 to operate attached actuators, such as servo motors, and communicate with the microprocessor system 70. Examples of such local control circuits are known to those of skill in the art.

In accordance with the protocols of the common bus system, discussed above, as is known to those of skill in the art, one or more transceivers 75, 76, and one or more bus control logic circuits 77, 78, are employed to communicate between the microprocessor system 70 and the common bus 60.

The firmware of the microprocessor system 70 responds to the messages provided by the transceivers 75, 76 and bus control logic circuits 77, 78, and to signals provided by the local control circuits 72, and provides signals to the local control circuits 72 and messages to the transceivers 75, 76 and bus control logic circuits 77, 78, so as to communicate over the common bus and to operate selected functions.

Referring to FIG. 3, one of the processor nodes is implemented as the communication processor node 50 and is coupled to each of the data storage drives 15 of the base frame 11, communicating with the drives and with host systems 40, 41 and 42. Alternatively, the host systems may be directly coupled to the communication processor node 50. As is known to those of skill in the art, various communication arrangements may be employed for communication with the hosts and with the data storage drives. In the example of FIG. 3, host connections 80 and 81 are SCSI busses. Busses 80 and 81 may comprise versions of a SCSI bus that provides each data bit on its own twisted pair of wires in the bus cable. Bus 82 comprises an example of a fibre channel arbitrated loop which is a high speed serial data interface, allowing transmission over greater distances than the SCSI bus systems.

In accordance with the present invention, the data storage drives 15 are in close proximity to the communication processor node 50, and may employ a short distance communication scheme, such as SCSI, or a serial connection, such as RS-422.

Referring to FIG. 3, the communication processor node 50 may additionally comprise firmware to control the power distribution to the data storage drives 15 and to the accessor 18. The processor node 50 operates an AC control 85 and a DC power supply control 86 to supply the correct voltages to itself and to the data storage drives 15 and to the accessor 18. For convenience, the processor node 50, the AC control 85 and the DC power supply control 86 may be mounted on the same frame control box 100.

The power is distributed to a junction, or frame interconnect card 110, and supplied on a common power bus 117, which may comprise multiple lines.

Referring to FIGS. 3, 4 and 5, the communication processor node 50 provides a communication link for the commands and data received from the hosts 40–42, interpreting and converting the commands as needed, and providing the commands on the common bus 60 to the accessor processor node 52 located at the accessor 18. In the example of a CAN bus system, as discussed above, with all of the processor nodes coupled to the common bus, the accessor processor node 52 recognizes that the message is intended for that node. The common bus 60 may also be coupled to a pluggable junction, such as the frame interconnect card 110.

The accessor processor node 52 may be programmed to be responsive to the linked commands, operating the gripper and providing X and Y move commands. The communication processor node or one of the accessor processor nodes may employ maps such as the map tables illustrated in FIGS. 4 and 5 to generate the move commands, as is known to those of skill in the art. For example, FIG. 4 comprises a map table 140 which relates the logical identifier 141 of a storage shelf of a received command to the physical X location 143 and the physical Y location 144 of the storage shelf 16 (in FIG. 1) in the library 10. Table 150 in FIG. 5 relates the logical identifier 151 of a data storage drive of a received command to the physical X location 153 and the physical Y location 154 of the data storage drive 15 in the library 10. The tables are employed to determine the physical location to retrieve the data storage media and the physical location to put the data storage media. The accessor processor node 52 may calculate the X and Y distances to be moved in the X and Y directions. The accessor processor node provides the move commands to the XY processor node. The accessor processor node may also provide the commands to operate the gripper to handle the media.

In accordance with the present invention, the XY processor node 55 (FIG. 3) may be located at the XY system 34 of accessor 18 and is coupled to the accessor processor node, the XY processor node programmed to be responsive to the move commands, operating the servo motors of the XY system 34. The XY processor node 55 may calculate accelerations of, and therefore the power to be applied by, the servo motors. Thus, the signals generated by the XY processor node will operate logic to control the servo motors to move the accessor 18 in the X direction and to move the gripper 20 in the Y direction.

As the gripper is moved to the originating location, the accessor processor node 52 operates the gripper to retrieve and grip the data storage media from a storage shelf or a data storage drive, and as the gripper is moved to the destination location, the accessor processor node operates the gripper to put and release the data storage media in a storage shelf or load the data storage media in a data storage drive.

The operator panel processor node 59 is programmed to provide an interface for communicating between the operator panel and the communication processor node 50, the accessor processor node 52, and the XY processor node 55. The node may also comprise circuitry to monitor and control an input/output station 150, which may be accessed by the accessor gripper so that data storage media may be moved into or out of the library 10. The input/output station may be treated as though it were a storage shelf by the accessor.

Referring to FIG. 3, an extension frame 12 may be employed in accordance with the present invention. The extension frame is provided with an extension common bus 152, which is coupled to the base frame common bus 60. Another communication processor node 155 may be located in the extension frame and may communicate with hosts and/or with any data storage drives 15 in frame 12, e.g., at input 156. Thus, commands from hosts may be received either directly or via the data storage drives. The communication processor node 155 is coupled to the extension common bus 152, the communication processor node providing a communication link for the commands and data to the extension common bus, so that the commands are linked to the base frame common bus 60 and to the accessor processor node 52. The extension common bus 152 may comprise a pluggable connection and a multi-drop bus network, or a wireless network system coupled to the base frame common bus 60, for example, by means of a connection at the frame interconnect card 110 in the base frame.

The communication processor node 155 may be mounted on a frame control box 160 in the extension frame 12 closely adjacent to the coupled data storage drives 15 of the extension frame 12, communicating with the drives and with the attached host systems, e.g., at connection 156. In accordance with the present invention, the base frame power supply 85, 86 may supply power on the base frame power bus 117 to the base frame, and to an extension frame power bus 137 to the communication processor node 155 of the extension frame. The extension frame power bus 137 is plugged into the base frame power bus, preferably at the frame interconnect card or junction 110. The extension frame power bus and base frame power bus, when coupled, may form a single common power bus set of wiring and plugs. Also, the communication extension frame common bus and base frame common bus may additionally be arranged in a common set of wiring with the power busses. The communication processor node 155 may receive power from an extension frame power supply 162–163, and the communication processor node may then operate the extension frame power supply 162–163 to supply power on the extension frame power bus and the base frame power bus and control the power distribution to the data storage drives 15 and to the accessor 18. Specifically, the processor node 155 operates an AC control 162 and a DC power supply control 163 to supply the correct voltages to itself and to the data storage drives 15 of the extension frame and to the accessor 18. For convenience, the processor node 155, the AC control 162 and the DC power supply control 163 may be mounted on the same frame control box 160. The power is then distributed to a junction, or frame interconnect card 170, and supplied on the common power bus 137. Alternatively, the processor node 155 may receive power from the power supply bus.

Additional extension frames with identical communication processor nodes 155, storage shelves 16, data storage drives 15, power supplies 162–163, extension busses 152, and extension power busses 137, may be provided and each is coupled to the adjacent extension frame.

Further, referring to FIG. 3, in accordance with the present invention, the automated data storage library 10 may additionally comprise another accessor 28, for example, in a high availability frame 13. The accessor 28 may comprise a gripper 30 for accessing the data storage media, and an XY system 36 having servo motors, for example, for moving the accessor in the X direction and the gripper in the Y direction. The high availability frame may be adjacent an extension frame 12, or adjacent the base frame 11, and the accessor 28 may run on the same path as accessor 18, or on an adjacent path. The high availability frame 13 may also have an I/O station and an operator's panel 280. The distributed control system may additionally comprise an extension common bus 200 coupled to the extension common bus 152 of an extension frame or to the common bus 60 of the base frame, e.g., at frame interconnect card 170, or 110. The extension common bus 200 may comprise a pluggable connection and a multi-drop bus network, or a wireless network system. Another communication processor node 250 may be provided, located in the high availability frame 13 for receiving commands from hosts, either directly or via data storage drives 15, e.g., at input 256. The communication processor node is coupled to the high availability frame extension common bus 200, e.g., at frame interconnect card 270, the communication processor node providing a communication link for the commands and data to the extension common bus. An accessor processor node 252 is located at the other accessor 28, coupled to the high availability frame extension common bus 200. The accessor processor node 252 of the high availability frame may be programmed to determine if the base frame accessor 18 is unavailable, and, in the event the base frame accessor is unavailable, to activate the accessor 28. Alternatively, both the communication processor node 50 of the base frame and the communication processor node 250 of the high availability frame may be programmed to determine if the base frame accessor 18 is unavailable and activate the accessor 28 if this is the case. As is known to those of skill in the art, garage areas should be provided for any inactive accessor to allow access by the active accessor to all storage shelves and data storage drives. Alternatively, both accessors may be operated simultaneously, as is known to those of skill in the art, to provide higher performance.

The accessor processor node 252, when the accessor 28 is activated, is responsive to the linked commands of the communication processor nodes, and may operate the gripper 30 and provide X and Y move commands, both in exactly the same manner as the accessor processor node 52. An XY processor node 255 at the XY system 36 is coupled to the high availability frame extension common bus 200, and is responsive to the move commands of the accessor processor node 252, operating the servo motors.

Thus, the high availability frame 13 allows a fully redundant library system 10.

The communication processor node 250 is mounted on a frame control box 260 and operates an AC control 262 and a DC power supply control 263 to supply the correct voltages to itself and to any data storage drives 15 of the high availability frame and to the accessor 28. The power is then distributed to a junction, or frame interconnect card 270, and supplied on common power bus 167. The power bus 167 may comprise multiple lines which are coupled to the power bus of the adjacent frame at the junction of the adjacent frame, for example, junction 170 of the extension frame. The power system 85–86 of the base frame, the power system 162–163 of the extension frame, or the power system 262–263 of the high availability frame supply power on the respective common power bus to both the accessor 18 and to the accessor 28. The base frame power bus 117, the high availability frame power bus 167, and any extension frame power bus 137, when coupled, may form a common power bus set of wiring and plugs. Also, the base frame common bus 60, high availability frame extension common bus 200, and any extension frame common bus 152 may comprise a common set of wiring with the power busses. The high availability frame 13 may also comprise a redundant operator panel 280 and an operator panel processor node 259, coupled to the common bus 200. The operator panel 280 may therefore be activated in the case of the unavailability of the operator panel 23, or, alternatively, both may be operated simultaneously and together.

Hence, the present invention provides a distributed control system for an automated data storage library which allows the reduction of overly lengthy cabling and complexity by locating the control processor nodes congruent with the respective functions, and allows modular extension to and redundancy for the library.

Those of skill in the art understand that the specific layout of the functions discussed herein may be altered consistent with the distributed control of the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated data storage library for accessing data storage media in response to received commands, comprising:

a communication processor node for receiving commands, said communication processor node providing a communication link for said commands;

an accessor having a gripper for accessing said data storage media, said accessor having an accessor processor node coupled to said communication processor node, said accessor processor node responsive to said linked commands, providing move commands; and an XY system having servo motors for moving said accessor and said gripper, said XY system having an XY processor node coupled to said accessor processor node, said XY processor node responsive to said move commands, operating said servo motors.

2. The automated data storage library of claim 1, wherein said accessor processor node is positioned at said gripper of said accessor and operates said gripper.

3. The automated data storage library of claim 1, additionally comprising a common bus, said communication processor node coupled to said accessor processor node via said common bus, and said accessor processor node coupled to said XY processor node via said common bus.

4. The automated data storage library of claim 3, wherein said common bus comprises a multi-drop bus network coupling said nodes.

5. The automated storage library of claim 3, additionally comprising another communication processor node for receiving commands, said another communication processor node coupled to said common bus, providing a communication link for said commands to said common bus.

6. The automated data storage library of claim 3, additionally comprising an operator panel; and an operator panel processor node coupled to said common bus for providing an interface for communicating between said operator panel and said communication processor node, said accessor processor node, and said XY processor node.

7. The automated data storage library of claim 3, wherein said communication processor node and said common bus are located in a base frame, and additionally comprising an extension frame having an extension common bus coupled to said base frame common bus, and having another communication processor node for receiving commands, said communication processor node coupled to said extension common bus, said communication processor node providing a communication link for said commands to said extension common bus, whereby said commands are linked to said base frame common bus and to said accessor processor node.

8. The automated data storage library of claim 7, wherein said extension common bus comprises a pluggable connection and a multi-drop bus network coupled to said base frame common bus.

9. The automated data storage library of claim 7, wherein said common bus and said extension common bus comprise a wireless network system.

10. The automated data storage library of claim 3, additionally comprising a another accessor having a gripper for accessing said data storage media, said accessor having an accessor processor node coupled to said common bus, said accessor processor node responsive to said linked commands of said communication processor node, providing move commands; and an XY system having servo motors for moving said accessor and said gripper, said XY system having an XY processor node coupled to said common bus, said XY processor node responsive to said move commands of said another accessor processor node, operating said servo motors.

11. The automated data storage library of claim 10, wherein said accessor processor nodes are positioned at said gripper of said respective accessor.

12. The automated data storage library of claim 10, additionally comprising a high availability frame having an extension common bus coupled to said common bus of an adjacent frame, said extension common bus coupled to said accessor processor node and said XY processor node of said another accessor.

13. The automated data storage library of claim 12, wherein said high availability frame common bus comprises a multi-drop bus network coupling said nodes and a pluggable connection to said adjacent frame common bus.

14. A distributed control system for an automated data storage library, said automated data storage library accessing data storage media in response to received commands, said automated data storage library comprising an accessor having a gripper for accessing said data storage media, and an XY system having servo motors for moving said accessor and said gripper, said distributed control system comprising:
- a communication processor node for receiving commands, said communication processor node providing a communication link for said commands;
- an accessor processor node at said accessor coupled to said communication processor node, said accessor processor node responsive to said linked commands, operating said gripper and providing move commands; and
- an XY processor node at said XY system coupled to said accessor processor node, said XY processor node responsive to said move commands, operating said servo motors.

15. The distributed control system of claim 14, wherein said accessor processor node is positioned at said gripper of said accessor and operates said gripper.

16. The distributed control system of claim 14, wherein said automated data storage library additionally comprises a plurality of data storage drives, said data storage drives receiving said commands; and wherein said distributed control system additionally provides said received commands from said data storage drives to said communication processor node.

17. The distributed control system of claim 14, additionally comprising a common bus, said communication processor node coupled to said accessor processor node via said common bus, and said accessor processor node coupled to said XY processor node via said common bus.

18. The distributed control system of claim 17, wherein said common bus comprises a multi-drop bus network coupling said nodes.

19. The distributed control system of claim 17, wherein said automated data storage library additionally comprises an operator panel; and wherein said distributed control system additionally comprises an operator panel processor node coupled to said common bus for providing an interface for communicating between said operator panel and said communication processor node, said accessor processor node, and said XY processor node.

20. The distributed control system of claim 17, wherein said communication processor node and said common bus are located in a base frame, and wherein said automated data storage library additionally comprises an extension frame;
- said distributed control system additionally comprising an extension common bus coupled to said base frame common bus, and another communication processor node in said extension frame for receiving commands, said communication processor node coupled to said extension common bus, said communication processor node providing a communication link for said commands to said extension common bus, whereby said commands are linked to said base frame common bus and to said accessor processor node.

21. The distributed control system of claim 20, wherein said extension common bus comprises a pluggable connection and a multi-drop bus network coupled to said base frame common bus.

22. The distributed control system of claim 20, wherein said common bus and said extension common bus comprise a wireless network system.

23. The distributed control system of claim 17, wherein said automated data storage library additionally has another accessor with a gripper for accessing said data storage media, and an XY system having servo motors for moving said accessor in the X direction and said gripper in the Y direction; and
- said distributed control system additionally comprises an extension common bus coupled to said common bus; an accessor processor node at said another accessor coupled to said extension common bus, said accessor processor node responsive to said linked commands of said communication processor node, operating said gripper and providing move commands; an XY processor node at said XY system coupled to said extension common bus, said XY processor node responsive to said move commands of said another accessor processor node, operating said servo motors.

24. The distributed control system of claim 23, wherein said extension common bus comprises a multi-drop bus network coupling aid nodes and a pluggable connection to said adjacent frame common bus.

25. The distributed control system of claim 23, wherein said accessor processor nodes are positioned at said gripper of said respective accessor.

26. The distributed control system of claim 23, wherein said extension common bus comprises a wireless network system.

27. A distributed control system for an automated data storage library, said automated data storage library accessing data storage media in response to received commands, said automated data storage library comprising a plurality of accessors, each having a gripper for accessing said data storage media, said distributed control system comprising:
- at least one communication processor node for receiving commands, said communication processor node providing a communication link for said commands; and
- an accessor processor node at each of said accessors coupled to said communication processor node, said accessor processor node responsive to said linked commands, operating said accessors and said grippers.

28. The distributed control system of claim 27, additionally comprising a common bus, said communication processor node coupled to each of said accessor processor nodes via said common bus.

29. The distributed control system of claim 28, wherein said common bus comprises a multi-drop bus network coupling said nodes.

30. The distributed control system of claim 28, wherein said common bus comprises a wireless network system.

\* \* \* \* \*

UNITED STATES PATENT AND TRADEMARK OFFICE
CERTIFICATE OF CORRECTION

PATENT NO.   : 6,356,803 B1
DATED        : March 12, 2002
INVENTOR(S)  : Goodman et al.

It is certified that error appears in the above-identified patent and that said Letters Patent is hereby corrected as shown below:

<u>Title page,</u>
Item [56], References Cited, change "6,005,823" to -- 6,005,853 --

<u>Column 12,</u>
Line 27, change "aid" to -- said --

Signed and Sealed this

Third Day of December, 2002

JAMES E. ROGAN
*Director of the United States Patent and Trademark Office*